Sept. 27, 1949. M. G. R. PETTY ET AL 2,483,349
HYDRAULIC POWER INSTALLATION
Filed March 20, 1945 3 Sheets-Sheet 1

INVENTORS
MICHAEL G.R. PETTY
BY GEORGE F. JONES

Agent

Sept. 27, 1949.  M. G. R. PETTY ET AL  2,483,349
HYDRAULIC POWER INSTALLATION
Filed March 20, 1945  3 Sheets-Sheet 2

INVENTORS
MICHAEL G. R. PETTY
GEORGE F. JONES
BY
Jerome W Paxton
Agent.

Sept. 27, 1949.    M. G. R. PETTY ET AL    2,483,349
HYDRAULIC POWER INSTALLATION
Filed March 20, 1945    3 Sheets-Sheet 3
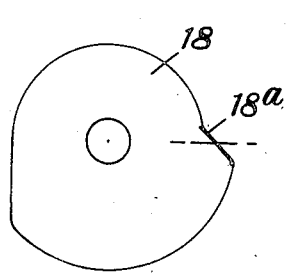
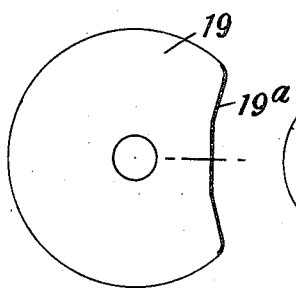
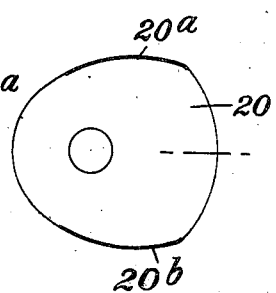
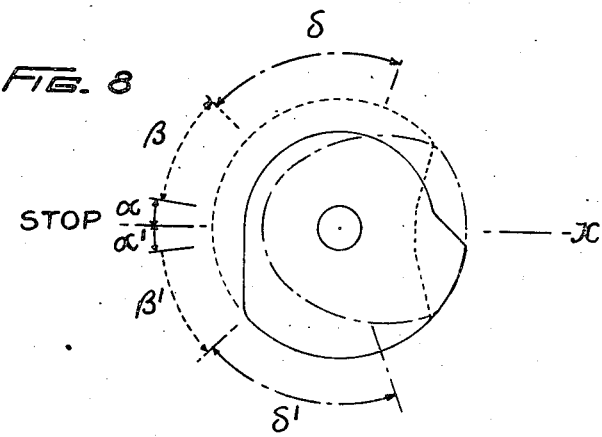
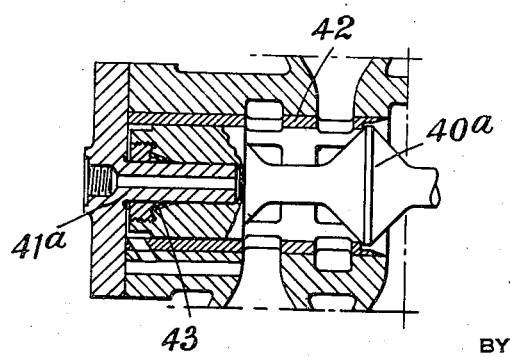
INVENTORS
MICHAEL G.R. PETTY
BY  GEORGE F. JONES
Jerome W. Paxton
Agent.

Patented Sept. 27, 1949

2,483,349

UNITED STATES PATENT OFFICE 2,483,349

HYDRAULIC POWER INSTALLATION

Michael Gray Radcliffe Petty, Devizes, and George Frederick Jones, Aldwych, London, England, assignors to Commercial Patents Limited, London, England, a British company Application March 20, 1945, Serial No. 583,760
In Great Britain March 9, 1944

4 Claims. (Cl. 60—19)

This invention has particular reference to improvements in and relating to the propulsion of ships, the primary object of the invention being the provision of a propulsion installation showing saving in dead weight of the propelling machinery and a considerable saving in cargo space.

The propulsion installation according to the invention comprises, in combination, a number of high pressure, hydraulic pumps, an equal number of internal combustion (preferably Diesel) engines adapted to drive the pumps, a high pressure, hydraulic motor to which the pumps are connected so as collectively to supply live liquid to it, a rotating part, for example, a ship's propeller adapted to be driven by said motor and speed control means adapted to control the rate (and if desired the direction) of rotation of the said rotating part, the full power rating of any pump representing a fractional part of the full power rating of the motor. The speed control means preferably acts on the engines.

To avoid the use of an inconveniently large motor a number of smaller high pressure motors may be provided for driving the rotating part. In this case also the full power rating of any pump represents but a fractional part of the full power rating of each or any motor and either the motors are supplied with live liquid from a common hydraulic main into which all pumps deliver the liquid or individual motors are associated with individual groups of pumps. High pressures are used in order to enable the installation to be confined to a comparatively small compass.

It will be appreciated in the art that the expression "high pressure" implies the use of oil pressures of the order of 1,000 lbs. per square inch and upwards and the said expression is intended to be so construed in this specification and in its claiming clauses. In ship propulsion installations according to this invention we prefer to use pressures of the order of 2,000 lbs. per square inch.

The pumps and the motor or motors may be of any suitable construction and are preferably of radial cylinder type. The engines and pumps may be grouped one above another, side by side or in any other convenient arrangement and need not be in close proximity to the motor or motors, the only connection between the pumps or between each group of pumps and their motor being in the form of hydraulic piping. It will be readily appreciated that when applying the invention to ship propulsion a battery of 20 Diesel hydraulic pumps for example producing 2,000 H. P. will occupy a very small space, (and may be located, say, right aft in the ship) and will obviate the necessity for heavy steam engines, multiple boilers, coal bunkers, water and the auxiliaries thereto. The pumps may be completely submerged in lubricant. Reduction gear may transmit the drives from the engines to the pumps and reduction gear, which may comprise reversing gear, may transmit the drive from the motor or motors to the propeller shaft. Preferably, however, the motor is or the motors are reversible, reversing being effected by suitable control valves.

In accordance with a further and a preferable feature of the invention, control of the hydraulic fluid is effected by means comprising a stop and go valve and a motor control valve, the stop and go valve being adapted either to by-pass the live fluid from the pumps in relation to the motor control valve or to direct it to the motor control valve and the motor control valve being adapted to determine the direction of live liquid flow into the motor. The motor control valve, the stop and go valve and the engines are controlled by means which when operated from the stop position set the motor control valve for direction of liquid flow, open the stop and go valve to the motor control valve and finally speed up the engines to increase the flow of high pressure fluid; and the said means during its return to the stop position reduces the speed of the engines and finally opens the stop and go valve. The said means, because it operates in this manner, ensures that high pressure liquid is supplied to the motor control valve only after the latter has been operated to receive it and to discharge it in the required direction, gives operating ranges wherein speed control of the engines and, therefore, (in the case of the application of the invention to ship propulsion) of the propeller shaft can be effected without the setting of the valves being affected and ensures that valve operations are not carried out at accelerated engine speeds. In order to ensure full and immediate setting of the motor control valve at starting the control means comprises a pilot valve and the motor control valve is of piston-actuated type, the pilot valve being arranged to admit piston-actuating liquid to the motor control valve according to the required direction of live liquid flow to the motor.

Additional advantages of the present invention are as follows:

Owing to the fact that the main power is generated by a number of small engines and pumps rather than from one large prime mover the power output and fuel consumption can be readily adjusted at all times to suit the conditions prevailing at the time. For example, a ship embodying the invention, when returning part laden, or light, will be able to proceed at great saving in fuel by cutting out as many of the units as are found unnecessary. The risk of breakdown is greatly reduced, for should one or more motors fail there will still be more than sufficient for the vessel to continue on passage.

This carrying of spare units will also enable the engineers of the ship to overhaul two or more units on each voyage; and in this way, each unit will be worked on a log basis of number of hours run; and maintenance of the vessel in first class condition will at all times be possible without the usual loss of time for refitting and overhauling.

The invention will now be described in its application to ship propulsion with reference to the example shown in the accompanying drawings; but it will be understood that this description is merely illustrative and the invention is not limited thereto.

In these drawings:

Fig. 1 is a diagrammatic layout of a propulsion unit comprising two batteries 1 and 2 of engines and pumps and a single reversible motor 3 adapted to be supplied with pressure liquid from all pumps;

Figs. 2, 3 and 4, respectively, are sectional elevations of a pilot valve, a motor control valve and a stop and go valve comprised in the control means for the installation, the valves being of balanced, sliding piston type.

Figs. 5, 6 and 7, respectively, show a pilot control cam, a stop and go valve control cam and an engine speed control cam;

Fig. 8 shows the cams in their correct relative setting on a shaft; and

Fig. 9 is a detail, in sectional elevation, showing modifications applicable to the motor control valve of Fig. 3.

Figure 1:
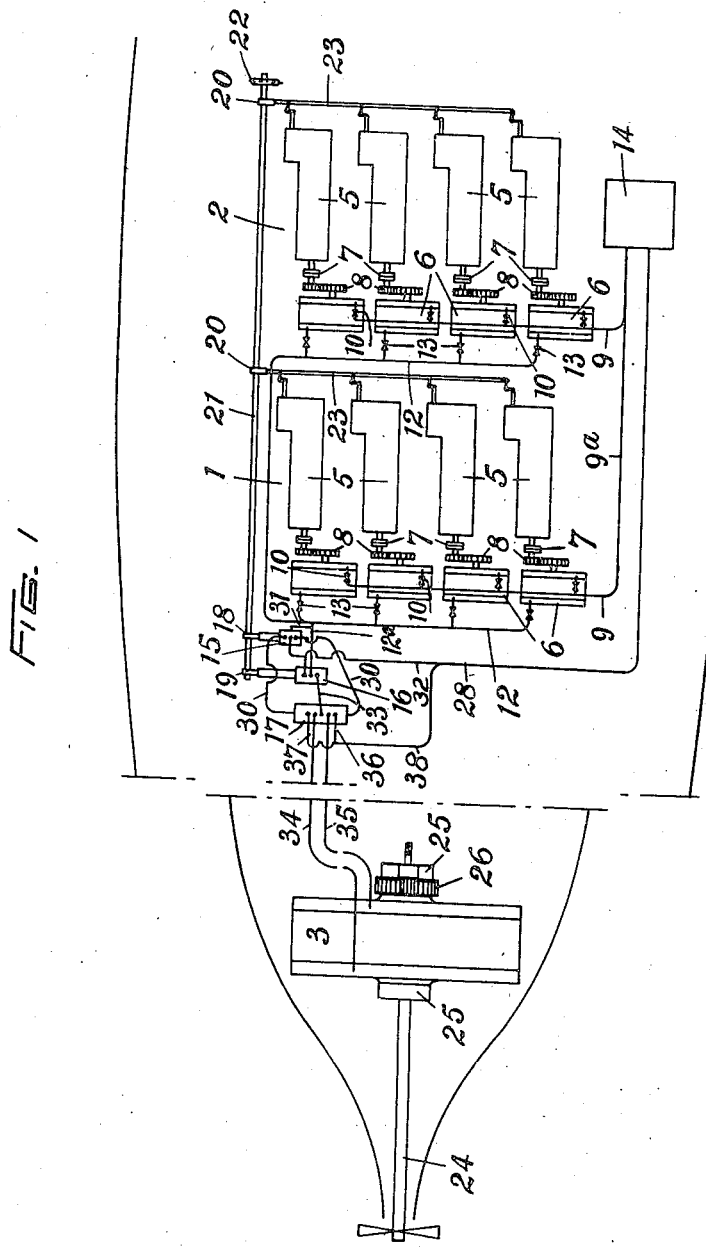
Figure 2:
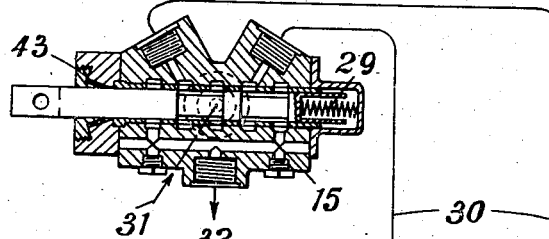

Each of the batteries 1, 2, comprises four Diesel engines 5 and four high pressure pumps 6, the engines being connected to the pumps by means of couplings 7 and reduction gear 8. The pumps are connected to inflow pipes 9 by branches in which are stop valves 10 and are connected to pressure pipes 12 by branches in which are stop valves 13. The pipes 9 branch from a main 9a leading from a suction tank 14; the pipes 12 deliver into a common main 12a.

As there are eight pumps and one motor the full load rating of each pump represents a little more than ⅛ the full load rating of the motor.

The control means for the installation comprises a pilot valve 15, a stop and go valve 16 and a motor control valve 17, and cams 18, 19 and 20—20 for controlling the valve 15, valve 16 and the speed governors of the Diesel engines, said cams being fixed to the shaft 21. The cam shaft may be operated by any suitable means controlled from the bridge of the vessel. One such means which will be readily apparent to those skilled in the art is hydraulic. Another means comprises chain and spur gearing, and a spur wheel of such gearing is shown at 22, Fig. 1, said spur wheel being fixed to the cam shaft.

The cams 20 are connected to the governors of the engines by the push rods 23 and bell crank levers shown in Fig. 1. It will be understood that each cam 20 has the profile shown in Fig. 7 and all governors are affected similarly and simultaneously by the two cams.

The motor 3 drives the propeller shaft 24 directly but the drive may be through reduction gearing. The motor is normally held fixed by any suitable means not shown but in order that underneath and lateral parts thereof may be made readily accessible for inspection and relacement it is mounted in bearings 25 and is provided with hand gear 26 for rotating it bodily after the holding means has been released.

When the control means is in the stop condition the position of the cam profiles with respect to the axes of the pistons of the valves 15 and 16 and the axes of the push rods 23 is as shown in Fig. 8, the said axes being indicated by the chain line $x$. In these circumstances the engines are running at minimum speed. The engines drive the pumps and the liquid, which is conducted to the valve 16 by the main 12a, is by-passed by the valve to the exhaust pipe 28, the pipe 28 leading to the suction tank 14.

When the shaft is turned (say clockwise for ahead and anti-clockwise for astern) the cam profile 18a either pushes the piston of the valve 15 to one end of the case thereof or allows the spring 29 in the valve to push the piston to the opposite end of the case. This allows liquid to flow through the valve and to one end or the other of the motor control valve 17, the flow being by way of one or the other of two pipes 30. Liquid enters the valve 15 by way of a pipe 31 branched from the main 12a. The valve 17 is of piston actuated type so the liquid in the appropriate end of the case forces the piston towards the opposite end (if it is not already there). These operations are effected whilst the camshaft is moving through angle $\alpha$ or $\alpha^1$. Liquid in that end of the case into which the piston moves is by-passed by the valve 15 to a branch pipe 32 which leads to the exhaust pipe 28.

Continued movement of the camshaft (movement through angle $\beta$ or $\beta^1$) causes the profile 19a of the cam 19 to press the piston of the valve 16 inwards whereupon liquid normally by-passed by the valve is conducted to the central inflow passage of the valve 17 by the pipe 33. The liquid flows to the motor either through main 34 or main 35 and returns to the valve 17 by main 35 or by main 34, according to the setting of the valve, and passes to the exhaust pipe 28 by branch pipe 36 or 37 and a pipe 38.

Continued movement of the camshaft (through angle $\delta$ or $\delta^1$) causes one of the profiles 20a or 20b of each cam 20 to speed up the engines, the resulting increased volume of high pressure liquid being fed to the motor 3 and, by means of one of the mains 34 or 35 and the exhaust pipe 28, returned to the suction tank.

Reverse rotation of the cam shaft as far as the stop position first causes the engine speed to be decreased from maximum to minimum, thereby decreasing the volume of high pressure liquid to a minimum, then causes the valve 16 to by-pass the liquid instead of directing it to the motor and finally centralizes the pilot valve 15, a spring 39 which presses against one end of the piston of valve 16 causing the said piston to move to the by-pass position.

It will be understood that movement of the camshaft through either angle δ or angle δ¹ away from the stop position accelerates the engines and return movement throughout the angle reduces their speed; and whilst the cam profiles 20ª or 20ᵇ are in operation the valves maintain their setting.

Figure 3:
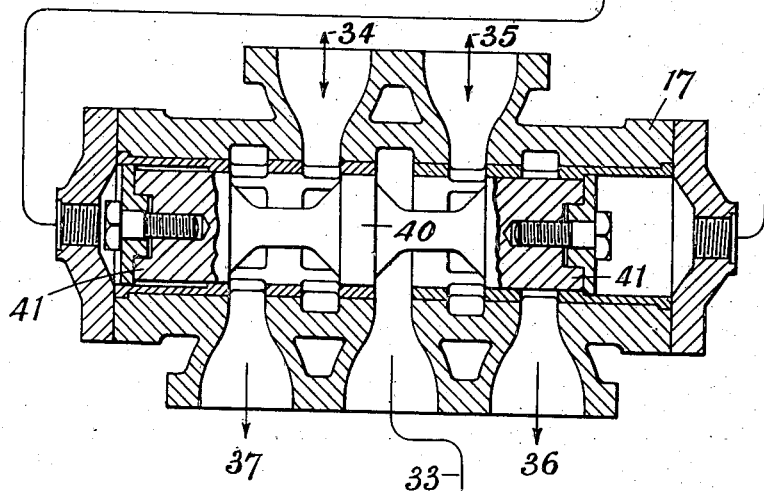
Figure 4:
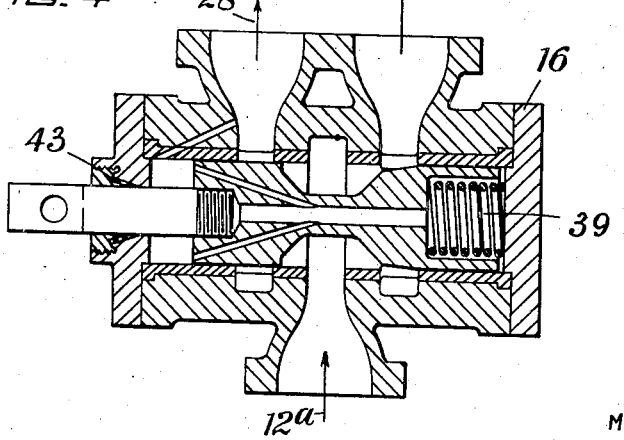

In Fig. 3 the blocking portion 40 of the piston is of usual cylindrical form and the actuating pistons 41 are rigid with the piston or slide of the valve. The said blocking portion may, however, be of double conical form as shown at 40ª, Fig. 9, the liners 42 of the valve being adapted to provide seats for the enlargement 40ª, and/or fixed actuating pistons 41ª, Fig. 9, may be used in place of the pistons 41, said pistons 41ª extending into bores in the ends of the piston or slide of the valve. The fixed pistons as 41ª, Fig. 9, and the piston rods of the valves 15 and 16 are packed by conical packings 43. With respect to the piston 41ª, it will be noted that it is a stationary piston and its cylinder is formed by the head of the sliding piston. When fluid is forced through the conduit in member 41ª, the piston 40 is forced to the right and is returned by a similar arrangement. The working fluid does not enter the space in which the head of the piston slides. It only enters the space between the end of the recess containing the piston 41ª and the piston.

Owing to the provision of the stop valves 10 and 13 any engine and its pump may be stopped whilst the remaining engines and pumps are running and owing to the couplings 7 and the stop valves any engine and/or its pump may be removed for repair, overhaul or replacement without it being necessary to shut the whole installation down. If desired valves may be provided whereby either battery may drive the motor whilst the other battery is idle or under repair etc.

Instead of a single motor for driving the propeller shaft we may use two or more motors for this purpose, each motor being supplied with pressure liquid from an individual battery of pumps and motors or the motors may be fed in parallel from a main into which all pumps deliver liquid.

What we claim is:

1. A hydraulic power installation comprising in combination a plurality of hydraulic pumps, a plurality of prime movers to drive said pumps, output regulators for said prime movers, a hydraulic motor, an output shaft driven thereby and a fluid control system including a stop and go valve, and a motor control valve, said stop and go valve being adapted either to by-pass the live fluid from the pumps to a reservoir or to direct it through the motor control valve and the motor control valve being adapted to determine the direction of the live fluid flow into the motor, said fluid control system including control means having stop and operating positions for controllably adjusting the motor control valve, the stop and go valve and the output regulators of the prime movers, said control means when operated from said stop position first setting the motor control valve for direction of fluid flow, then opening the stop and go valve to the motor control valve and finally speeding up the prime movers and, on its return, reducing the speed of the prime movers and then opening the stop and go valve to by-pass.

2. A hydraulic power installation comprising in combination a plurality of hydraulic pumps, a plurality of prime movers to drive said pumps, output regulators for said prime movers, a hydraulic motor, an output shaft driven thereby and a fluid control system including a stop and go valve, a motor control valve, hydraulic actuating means therefor and a pilot valve for controlling said actuating means, according to the required direction of live liquid flow to the motor, said stop and go valve being adapted either to by-pass the live fluid from the pumps to a reservoir or to direct it through the motor control valve, and the motor control valve being adapted to determine the direction of the live fluid flow into the motor, said fluid control system including control means having stop and operating positions for controllably adjusting the motor control valve, the stop and go valve and the output regulators of the prime movers, said control means when operated from said stop position first actuating the pilot valve to set the motor control valve for direction of fluid flow, then opening the stop and go valve to the motor control valve and finally speeding up the prime movers and, on its return, reducing the speed of the prime movers and then opening the stop and go valve to by-pass.

3. A hydraulic power installation comprising in combination a plurality of hydraulic pumps, a plurality of prime movers to drive said pumps, output regulators for said prime movers, a hydraulic motor, an output shaft driven thereby and a fluid control system including a stop and go valve, and a motor control valve, said stop and go valve being adapted either to by-pass the live fluid from the pumps to a reservoir or to direct it through the motor control valve, and the motor control valve being adapted to determine the direction of the live fluid flow into the motor, said fluid control system including cams having stop positions for controllably adjusting the motor control valve, the stop and go valve and the output regulators of the prime movers, said cams when operated from said stop positions first setting the motor control valve for direction of fluid flow, then opening the stop and go valve to the motor control valve and finally speeding up the prime movers, and, on their return, reducing the speed of the prime movers and then opening the stop and go valve to by-pass.

4. A hydraulic power installation comprising in combination a plurality of hydraulic pumps, a plurality of prime movers to drive said pumps, output regulators for said prime movers, a hydraulic motor, an output shaft driven thereby and a fluid control system including a stop and go valve, and a motor control valve including a sliding piston having a central blocking portion with fluid passages on each side thereof to communicate with inlet and outlet passages and valve seatings against which said central blocking portion seats in either extreme position, said stop and go valve being adapted either to by-pass the live fluid from the pumps to a reservoir or to direct it through the motor control valve, and the motor control valve being adapted to determine the direction of the live fluid flow into the motor, said fluid control system including control means having stop and operating positions for controllably adjusting the motor control valve, the stop and go valve and the output regulators of the prime movers, said control means when operated from said stop position first setting the motor control valve for direction of fluid flow, then opening the stop and go valve to the motor control valve and finally speeding up the prime movers and, on its return, reducing the speed of the prime movers and then opening the stop and go valve to by-pass.

MICHAEL GRAY RADCLIFFE PETTY.
GEORGE FREDERICK JONES.

REFERENCES CITED

The following references are of record in the file of this patent:

UNITED STATES PATENTS

| Number | Name | Date |
|---|---|---|
| 1,047,329 | Sundh | Dec. 17, 1912 |
| 1,077,980 | Hele-Shaw | Nov. 11, 1913 |
| 1,198,093 | Williams | Sept. 12, 1916 |
| 1,332,631 | Morse | Mar. 2, 1920 |
| 1,526,976 | Gregory | Feb. 17, 1925 |
| 1,781,656 | Day | Nov. 11, 1930 |
| 2,196,696 | Dick | Apr. 9, 1940 |
| 2,322,522 | Johansson | June 22, 1943 |

FOREIGN PATENTS

| Number | Country | Date |
|---|---|---|
| 413,217 | France | May 21, 1910 |
| 392,973 | Germany | Mar. 27, 1924 |
| 478,950 | Great Britain | Jan. 24, 1938 |